Dec. 23, 1924.
G. MEIERHOEFER
AUTOMOBILE SIGNAL
Filed Jan. 30, 1922
1,520,477
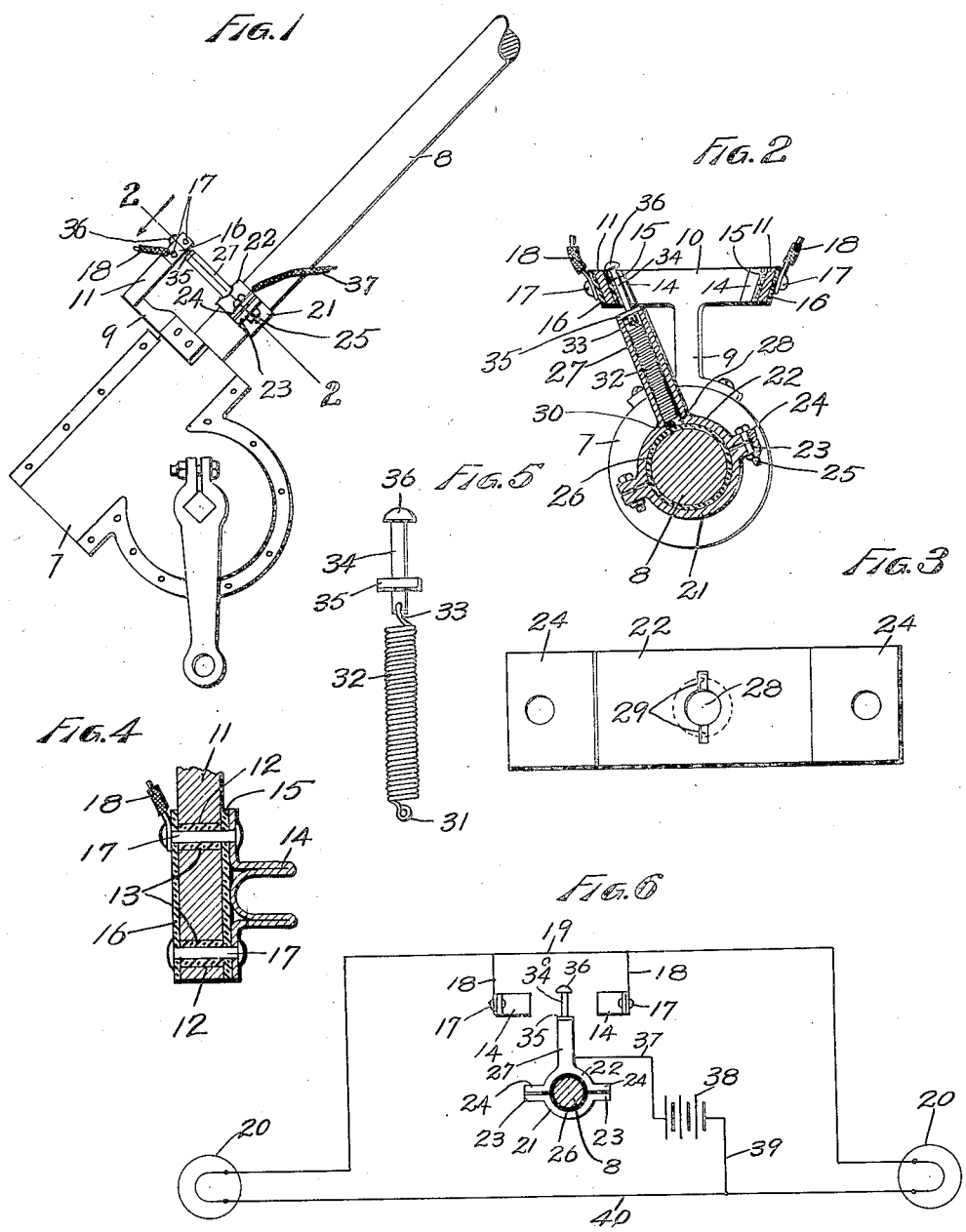
INVENTOR
GEORGE MEIERHOEFER
BY Edward E Longan
ATTY.

Patented Dec. 23, 1924.

1,520,477

UNITED STATES PATENT OFFICE.

GEORGE MEIERHOEFER, OF ST. LOUIS, MISSOURI.

AUTOMOBILE SIGNAL.

Application filed January 30, 1922. Serial No. 532,636.

*To all whom it may concern:*

Be it known that I, GEORGE MEIERHOEFER, a citizen of the United States, and resident of the city of St. Louis and State of Missouri, have invented certain new and useful Improvements in Automobile Signals, of which the following is a specification containing a full, clear, and exact description, reference being had to the accompanying drawings, forming a part hereof.

My invention relates to improvements in automobile signals, and has for its object a signal which will flash a signal when the automobile is turned to the right or left.

A further object is to construct a signal for automobiles, in which an electric light is illuminated when the automobile is directed to the right or left. This illumination taking place simultaneously with the turning of the steering post.

In the drawings,

Fig. 1 is a side elevation of a portion of an automobile steering mechanism with my device in position.

Fig. 2 an enlarged section taken on the line 2—2 of Fig. 1.

Fig. 3 an enlarged bottom plan view of the upper portion of the yoke which carries the movable contact.

Fig. 4 an enlarged section taken through one of the stationary contacts.

Fig. 5 an enlarged view of the movable contact together with the retracting spring.

Fig. 6 a view showing the manner of connecting up the several parts.

In the construction of my device I employ the ordinary steering gear of an automobile which consists of the worm housing 7 and steering post 8. To the upper end of the steering post 8 is attached the usual steering wheel, (not shown). Attached to the worm housing 7 is a standard 9 which has its upper portion 10 bifurcated or provided with spaced apart arms 11. These spaced apart arms are provided with openings 12, in which are located insulating sleeves 13. Secured to the arms 11 are stationary contacts 14 which are insulated from the arms by means of insulating strips 15 and 16. These arms are secured by means of rivets 17 or any other similar fastening means and are entirely insulated from the arms 11. To one of the rivets or fastening means 17 are secured electric conductors 18. These electric conductors are attached to a conductor 19 which leads to lamps 20. Secured around the steering post 8 is a yoke composed of sections 21 and 22. These sections are provided with ears 23 and 24 which permit the bolts 25 to pass therethrough, for the purpose of securing them on the steering post. This yoke is insulated from the steering post by a strip of insulating material 26. The portion 22 of the yoke is provided with an integrally formed projection 27 which is provided with a bore 28. The lower end of this bore is provided with recesses 29 to receive a pin 30, which pin is secured in the eye 31 of the retracting spring 32. The end 33 of the retracting spring is secured to the movable contact 34, and the spring has a tendency to normally hold the movable contact in the position indicated in Fig. 2.

In order to prevent the movable contact from being drawn too far into the cylindrical projection 27, I form the collar 35 integral therewith, while the upper end of the contact 34 is provided with a head 36 which prevents it from passing through the stationary contacts 14. Secured to the yoke is an electric conductor 37 which leads to a battery or other suitable source of electrical energy 38. From the battery the conductor 39 leads to a conductor 40. This conductor is attached to the lamps 20.

The operation of my device is as follows:

The device is installed in such a manner that when the guiding wheels of the automobile point straight forward, the movable contact will be midway between the arms 11. The movable contact is free to move a certain distance, such as is required to keep the machine running straight without making a contact, but when moved beyond this, the movable contact will engage with one of the stationary contacts and complete the circuit through the battery, thus lighting the lamps. A continued movement in the same direction of the steering column will allow the movable contact to remain in the stationary contact, being held there by the head 36, while the wheel continues to turn. This will cause an extension of the retraction spring, but will at the same time maintain a constant circuit. In again straightening out the wheels this spring will retract and withdraw the movable contact into the cylindrical projection 27 until stopped by the collar 35. In this position the movable contact is free to swing out of the stationary contact. The circuit will then be broken and the lights extinguished. It is to be understood, of course, that the pin 30 fits snugly within the recesses 29, so that it cannot shift out of the eye 31 of the spring 32, and still it is possible to remove the spring 32 by detaching the yoke, pulling out the spring 32, and removing the pin 30.

While I have shown my device as lighting two lamps simultaneously, I may also construct a device to operate only one light or by establishing a separate circuit for each arm 11, use a separate light for each direction, without departing from the spirit of my invention. My device being intended primarily to warn traffic officers and also following cars that the position of the vehicle is going to be altered either to the right or left, as the case may be.

Having fully described my invention, what I claim is:

1. An automobile signal comprising in combination with a steering post, and a worm housing surrounding the lower end of said post, stationary contacts mounted on and insulated from said housing, a yoke having a hollow projection secured to said steering post, a headed movable contact carried by said hollow projection, a spring for yieldably securing said movable contact within said projection, and electric conductors secured to said stationary contacts and to said yoke.

2. An automobile signal comprising in combination with the steering post of an automobile and the worm housing surrounding the lower end thereof, a bifurcated standard mounted on the housing, and insulated therefrom, U shaped contacts mounted on said standard, a yoke having a hollow projection secured to the steering post adjacent the worm housing and insulated from said post, a headed contact removably located in said hollow projection, a coil spring having one end secured within said hollow projection, its opposite end secured to the headed contact for yieldingly securing said headed contact within the yoke and permitting its withdrawal therefrom, means for limiting the entrance of the headed contact into said hollow projection, and an electric conductor secured to the stationary contacts and said yoke.

In testimony whereof, I have signed my name to this specification.

GEORGE MEIERHOEFER.